(12) United States Patent
Sill et al.

(10) Patent No.: US 8,718,032 B1
(45) Date of Patent: May 6, 2014

(54) DELIVERING PACKET DATA TO A MOBILE STATION FOLLOWING INADVERTENT LOSS OF DATA-LINK-LAYER CONNECTION BETWEEN A WIRELESS-NETWORK ENTITY AND THE MOBILE STATION

(75) Inventors: Timothy W. Sill, Platte City, MO (US); Douglas A. Olding, Overland Park, KS (US); Jeff S. Ward, Kansas City, MO (US); Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2310 days.

(21) Appl. No.: 11/451,940

(22) Filed: Jun. 13, 2006

(51) Int. Cl.
*H04B 7/216* (2006.01)

(52) U.S. Cl.
USPC ........................................... 370/342

(58) Field of Classification Search
USPC .......... 455/436; 370/331, 349, 332, 219, 352, 370/401, 254
See application file for complete search history.

(56) References Cited

U.S. PATENT DOCUMENTS

| | | | | |
|---|---|---|---|---|
| 6,330,447 | B1* | 12/2001 | Hengeveld | 455/436 |
| 7,106,710 | B1* | 9/2006 | Smith | 370/331 |
| 2003/0224792 | A1* | 12/2003 | Verma et al. | 455/436 |
| 2005/0089008 | A1* | 4/2005 | Choo et al. | 370/349 |
| 2005/0169249 | A1* | 8/2005 | Shirota et al. | 370/352 |
| 2006/0019654 | A1* | 1/2006 | Farrill | 455/426.1 |
| 2009/0016304 | A1* | 1/2009 | Aust et al. | 370/332 |

OTHER PUBLICATIONS

Simpson, "The Point-to-Point Protocol (PPP)," RFC 1661 (Jul. 1994).

\* cited by examiner

*Primary Examiner* — Kiet Doan

(57) ABSTRACT

Methods are provided for delivering packet data to a mobile station following inadvertent loss of a data-link-layer connection between a wireless-network entity and the mobile station. A first data-link-layer connection is established between (i) a wireless-network entity in a wireless network and (ii) a mobile station. The wireless-network entity responsively stores connection data pertaining to the first data-link-layer connection. An error condition is detected. Detecting the error condition comprises detecting that the wireless-network entity is incorrectly no longer storing the connection data pertaining to the first data-link-layer connection. Responsive to detecting the error condition, a second data-link-layer connection is established between the wireless-network entity and the mobile station.

18 Claims, 3 Drawing Sheets

DELIVERING PACKET DATA TO A MOBILE STATION FOLLOWING INADVERTENT LOSS OF DATA-LINK-LAYER CONNECTION BETWEEN A WIRELESS-NETWORK ENTITY AND THE MOBILE STATION

BACKGROUND

1. Technical Field

The present invention relates to wireless communications and, more particularly, to conducting packet-data-communication sessions at least in part over a wireless link.

2. Description of Related Art

More people than ever are using mobile stations, such as cellular telephones and personal digital assistants (PDAs), to connect to wireless networks, which are also referred to as cellular networks, cellular wireless networks, wireless wide area networks, cellular wireless communication systems, and by other names. Wireless networks typically provide both voice and packet-data communication using a wireless communication format such as Code Division Multiple Access (CDMA), or another format.

To engage in packet-data communication sessions, a mobile station may first acquire radio-frequency (RF) connectivity by communicating with entities known as a base transceiver station (BTS) and a base station controller (BSC). The mobile station may then request packet-data connectivity by sending an origination request over a common air interface channel (such as an access channel) via the BTS and BSC to an entity known as a mobile switching center (MSC). The mobile station may include in the request a code that indicates a desire to establish a packet-data connection. In response, the MSC may then send the request to the BSC, which may include a functional entity known as a packet control function (PCF).

The BSC may then establish a radio link with the mobile station by directing the mobile station to operate on a particular traffic channel. Additionally, the BSC may signal to an entity known as a packet data serving node (PDSN). The PDSN and the mobile station may then negotiate in part over the radio link to establish a data-link-layer connection ("data link"), which may be a point-to-point protocol (PPP) connection. Packet data may then be exchanged over the data link between the mobile station and the PDSN (using the radio link, among other media), which then provides the mobile station access to a packet-switched network.

The mobile station, now communicatively coupled to the packet-switched network, is typically identified by a network address, such as an IP address, which may be dynamically assigned using either a Simple-IP or Mobile-IP process. In a Simple-IP process, the PDSN assigns an IP address to the mobile station once the data link is established. In a Mobile-IP process, the PDSN may transmit a registration request to a home agent associated with the mobile station. If the home agent approves the request, it may assign an IP address to the mobile station. Or the mobile station may use a permanently-assigned IP address.

Once the mobile station has an IP address, it may engage in packet-data communication via the PDSN with devices communicatively connected with the packet-switched network. This communication typically involves both sending and receiving IP packets. Other entities on the network are able to transmit packets to the mobile station by sending them to the mobile station's IP address. The packets are directed, perhaps via a Mobile-IP home agent, to the PDSN, which delivers the data to the mobile station via the data link (over the radio link, among other media).

Some mobile stations may be programmed to, upon registering with the wireless network, attain packet-data connectivity in the manner described above. That is, the mobile station obtains a radio link, a data link with a PDSN, and an IP address on the network. The mobile station may then enter what is known as a "dormant" mode, in which it releases its radio link but it and the network maintain the data link and IP address. That way, if the mobile station receives data addressed to the IP address, the mobile station can be paged to establish a radio link, and then the data can be forwarded to the mobile station over the data link and radio link.

However, from time to time, the PDSN may inadvertently drop the data link that had been established between it and the mobile station. That is, the PDSN may incorrectly cease to maintain connection data pertaining to the data link. This may occur if a particular timer value takes on a zero value, if a release command or message is mistakenly sent to the PDSN that causes the PDSN to delete the connection data pertaining to the data link, or for another reason.

If this inadvertent dropping of the data link by the PDSN occurs, the mobile station still operates under the assumption that the wireless network is maintaining both an IP address and a data link for it; that is, the mobile station operates under the assumption that it is reachable by other entities at its IP address. If other entities transmit packet data to the mobile station's IP address, that data will be routed to the PDSN. The PDSN will then determine that it has no data link with that mobile station, and will drop the data. The transmitting entity may eventually determine that it—or another device on the communication path, or both—has not received confirmation of delivery of the data. In the context of real-time media sessions, such as push-to-talk (PTT) sessions, this may result in a negative experience for a calling party, who may be prompted to start talking as if the session was starting properly, only to be notified after 10 or 15 seconds that the call had never in fact been established.

This problem may be somewhat ameliorated by the fact that the mobile station may be programmed to establish a new data link every so often. However, "every so often" may be as infrequently as once every ninety minutes. Thus, the mobile station may operate as if it is able to receive packet data—though in fact it is not—for whatever portion of that ninety-minute period remains following the inadvertent dropping of the data link by the PDSN. Note that a mobile station would also establish a new data link if, at any time during this period, it initiated a packet-data communication session of its own. But it may not.

SUMMARY

Methods are provided for delivering packet data to a mobile station following inadvertent loss of a data-link-layer connection between a wireless-network entity and the mobile station. In one aspect of the present invention, an exemplary embodiment may take the form of a method. In accordance with the method, a first data-link-layer connection is established between (i) a wireless-network entity in a wireless network and (ii) a mobile station. The wireless-network entity responsively stores connection data pertaining to the first data-link-layer connection. An error condition is detected. Detecting the error condition comprises detecting that the wireless-network entity is incorrectly no longer storing the connection data pertaining to the first data-link-layer connection. Responsive to detecting the error condition, a second data-link-layer connection is established between the wireless-network entity and the mobile station.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
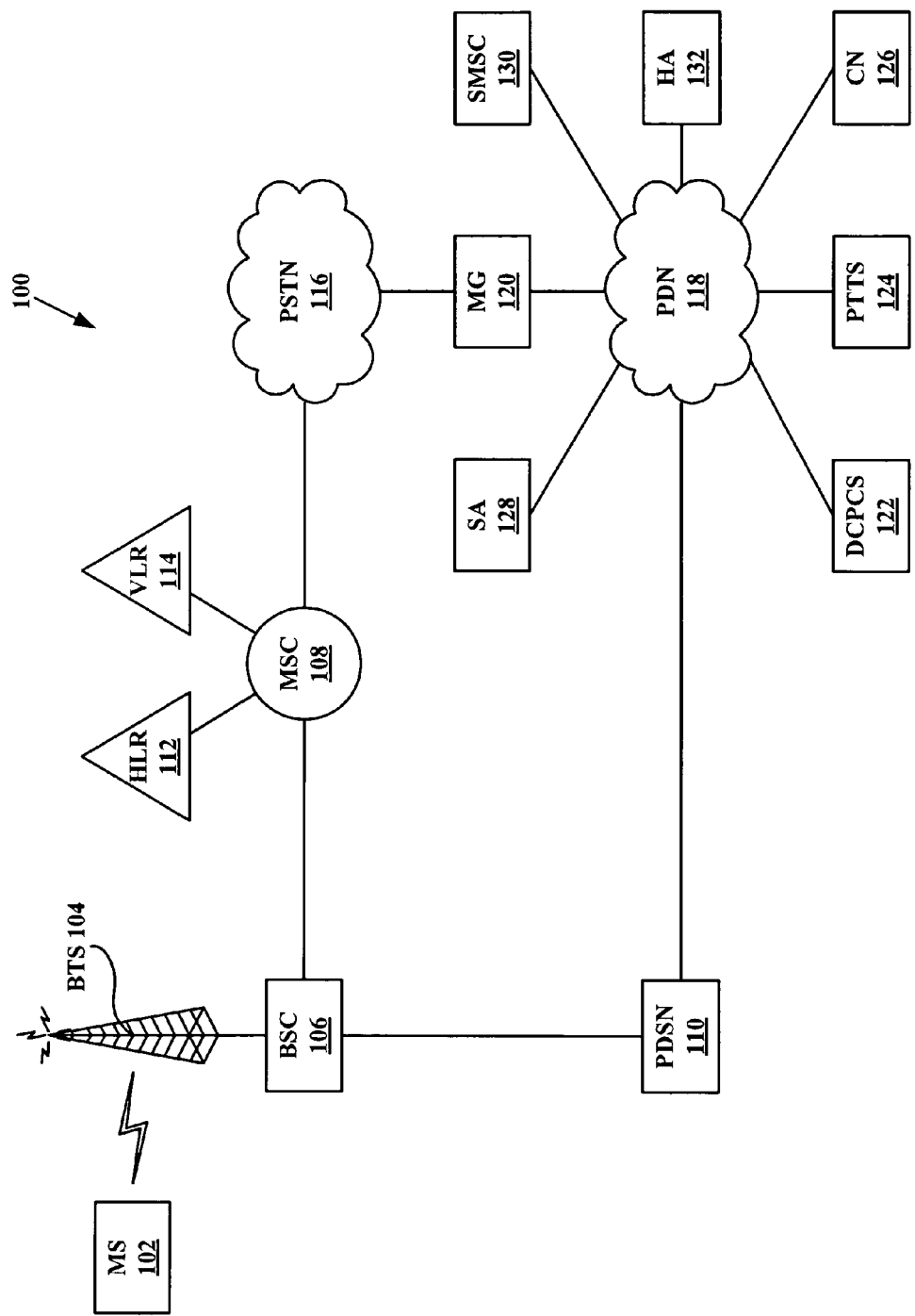
FIG. 1 is a simplified block diagram of an example of a communication system, in accordance with exemplary embodiments.

As presently contemplated, a mobile station may, perhaps in response to being powered on or entering the coverage area of a wireless network, or perhaps in response to a user action or some other trigger, acquire packet-data connectivity. The mobile station may initiate this process by transmitting a packet-data-origination request message over an access channel to the wireless network. The wireless network may then assign the mobile station a particular traffic channel on which to operate.

The mobile station and an entity such as a PDSN may then negotiate in part over that traffic channel to establish a data-link-layer connection between the mobile station and the PDSN. This data-link-layer connection could be a point-to-point protocol (PPP) connection, but could also conform to another protocol. The mobile station may then be assigned an IP address by the PDSN or perhaps by another entity such as a home agent. Alternatively, the mobile station may use a permanently or semi-permanently-assigned IP address.

In some embodiments, the mobile station may then go dormant, releasing its radio resources. In this case, both the mobile station and the network continue to maintain the IP address and the data-link-layer connection as being associated with the mobile station. In other embodiments, the mobile station may not release its assigned traffic channel.

Thereafter, unbeknownst to the mobile station, the PDSN inadvertently drops the data-link-layer connection. This drop may take the form of the PDSN deleting data that it may have stored pertaining to the data-link-layer connection, and may be the result of a timer value incorrectly being set to a zero value, the PDSN receiving an incorrectly-sent command or message to terminate the connection, or for any other reason.

One or more entities on or communicatively connected to the wireless network may thereafter detect that the PDSN is incorrectly not maintaining a data-link-layer connection with the mobile station. This error-condition detection may occur as a result of receiving packet data addressed to the mobile station. In other embodiments, this error-condition detection could occur as a result of a monitoring process that checks that data-link-layer-connections are being maintained for each of a set of mobile stations, such as all mobile stations that are registered to participate in Voice over IP (VoIP) sessions, such as push-to-talk (PTT) sessions.

Responsive to detection of this error condition, one or more entities on or communicatively connected to the wireless network may work to establish a new data-link-layer connection between the PDSN and the mobile station. In some embodiments, this may involve sending a message, such as a Short Message Service (SMS) message, to the mobile station. This SMS message may inform the mobile station of the error condition and instruct the mobile station to establish the new data-link-layer connection with the PDSN. The message may also include one or more suggested parameters for the new data-link-layer connection.

Responsive to receiving this message, the mobile station and the PDSN may negotiate to establish the new data-link-layer connection in much the same manner that those two entities negotiated to establish the inadvertently-dropped data-link-layer connection. Any packet data, the earlier receipt of which perhaps contributed to detection of the error condition, may then be delivered to the mobile station, perhaps at the initiative of the PDSN, home agent, or perhaps by virtue of retransmission by the sender. In this manner, mobile stations that are unaware that their data-link-layer connection has been inadvertently dropped on the network side may have their data-communication capability restored as a result of network-side detection and correction.

2. Exemplary Architecture a. Exemplary Communication System

FIG. 1 is a simplified block diagram of an example of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a mobile station (MS) 102, a BTS 104, a BSC 106, an MSC 108, a PDSN 110, a home location register (HLR) 112, a visitor location register (VLR) 114, a public switched telephone network (PSTN) 116, a packet-data network (PDN) 118, a media gateway (MG) 120, a data call processing control server (DCPCS) 122, a push-to-talk server (PTTS) 124, a corresponding node (CN) 126, a service agent (SA) 128, a short message service center (SMSC) 130, and a home agent (HA) 132.

It should be understood that the entities depicted in FIG. 1 are illustrative, and that fewer or more entities may be present. As examples, there could be any number of mobile stations in communication with BTS 104, multiple BTSs in communication with BSC 106, and/or any number of devices in communication with PDN 118. As another example, there could be any number of intermediate devices (such as routers or switches) and networks making up all or part of any of the communication links.

MS 102 may be any mobile device capable of communicating with one or more wireless networks. As examples, MS 102 may be a cellular telephone, PDA, or laptop computer. MS 102 may include a wireless-communication interface, a processor, and data storage having instructions executable by the processor for carrying out the mobile-station functions described herein. The wireless-communication interface may include a chipset and antenna for facilitating wireless communication. MS 102 may communicate with one or more wireless networks over an air interface using a protocol such as CDMA. In particular, the wireless communications may comply with the standards IS-95 and cdma2000®, which are incorporated by reference. Other exemplary air-interface protocols include Advanced Mobile Phone Service (AMPS), Time Division Multiple Access (TDMA), and Global System for Mobile communication (GSM).

FIG. 1 depicts BTS 104, BSC 106, and MSC 108 arranged and coupled with each other in a manner well known in the cellular telephony field. BTS 104 may comprise a tower with antennas that radiate to define a wireless air interface. BSC 106 may communicate with wireless devices over that air interface according to an agreed protocol, which may be one of the wireless protocols mentioned above, or some other protocol. MSC 108 then functions as a switch to provide connectivity with other switches in PSTN 116, which may be the well-known circuit-switched network known as the Public Switched Telephone Network, and may be communicatively coupled with at least MSC 108 and MG 120.

Further, MSC 108 may be coupled via a signaling link with HLR 112, which may store service profiles for various wireless devices such as MS 102. And MSC 108 may include or be interconnected with VLR 114, which stores local copies of those profiles for wireless devices that are currently operating within the wireless coverage area of MSC 108. Although FIG. 1 shows BSC 106 and MSC 108 as separate entities, the two could instead be integrated together.

For providing packet-data service to mobile stations such as MS 102, BSC 106 may include a packet control function (PCF) and may further be communicatively coupled to PDSN 110, which may in turn provide access to PDN 118. PDSN 110 may include one or more communication interfaces, a processor, and data storage having instructions executable by the processor for carrying out the PDSN functions described herein.

PDN 118 may include one or more wide area networks (WANs), one or more local area networks (LANs), one or more public networks such as the Internet, one or more private networks, one or more wired networks, and/or one or more wireless networks. Devices in communication with PDN 110 may exchange data using a packet-switched protocol such as the Internet Protocol (IP), and may be identified by an address such as an IP address.

MG 120 may be a networking device arranged to pass communications between PSTN 116 and PDN 118. As such, MG 120 may have one interface for communicating with PSTN 116 and another interface for communicating with PDN 118. MG 120 may thus receive circuit-switched signaling and bearer communications from PSTN 116, convert those communications to a packet-based format, and transmit those communications to PDN 118. Conversely, MG 120 may receive packet-based signaling and bearer communications from PDN 118, convert those communications to a circuit-switched format, and transmit those communications to PSTN 116.

DCPCS 122, PTTS 124, SA 128, SMSC 130, and HA 132 may each take the form of a computer—such as a network server—having one or more communication interfaces, a processor, and data storage having instructions executable by the processor for carrying out the functions described herein as being associated with that particular entity. Furthermore, any or all of these entities may be implemented as functional components of one or more network devices.

CN 126 may be any network device capable of sending packet data to MS 102 and of receiving packet data from MS 102. As such, CN 126 could be a personal computer, a PDA, a packet-data-communication-capable mobile station, or any other device. As such, CN 126 may have one or more communication interfaces—perhaps including a wireless-communication interface, a processor, and data storage having instructions executable by the processor for carrying out the corresponding-node functions described herein.

3. Exemplary Operation a. A First Exemplary Method

Figure 2:
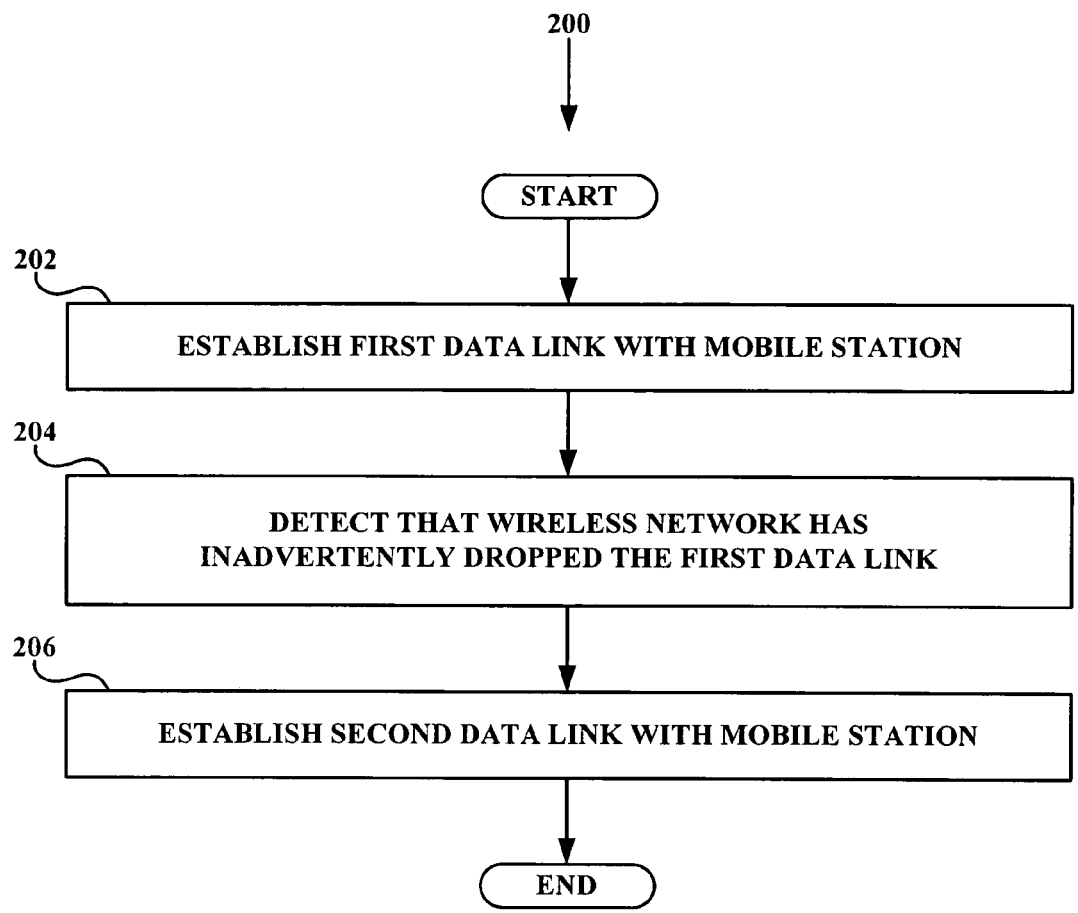
FIG. 2 is a flowchart of an exemplary embodiment, in the form of a method carried out along the communication system of FIG. 1.

FIG. 2 is a flowchart of an exemplary embodiment, in the form of a method carried out along the communication system of FIG. 1. As shown in FIG. 2, the method 200 begins at step 202, when PDSN 110 establishes a first data-link-layer connection with MS 102. As explained above, this first data-link-layer connection could be a PPP connection. Relevant aspects of PPP are described in "The Point-to-Point Protocol (PPP)," RFC 1661 (July 1994), which is incorporated herein by reference.

Prior to or as part of carrying out step 202, MS 102 may send a packet-data-origination request message via BTS 104 and BSC 106 to MSC 108. MSC 108 may then signal to BSC 106, which may then assign a traffic channel on which MS 102 should operate. BSC 106 may also signal to PDSN 110, which may then negotiate with MS 102 in part over that traffic channel to establish the first data-link-layer connection between MS 102 and PDSN 110. Both MS 102 and PDSN 110 may then store connection data that pertains to the first data-link-layer connection. Thereafter, MS 102 may be assigned an IP address by PDSN 110, HA 132, or some other entity; alternatively, MS 102 may use an IP address permanently assigned to it.

At this point, MS 102 may engage in packet-data communication via PDSN 110 with one or more entities connected to PDN 118. For example, MS 102 may register with a VoIP server such as PTTS 124. So, after acquiring an IP address, MS 102 may or may not engage in some packet-data communication. If MS 102 simply wanted to acquire packet-data connectivity but not engage in any further packet-data communication at that moment, MS 102 may enter what is known as dormant mode, in which MS 102 releases its radio traffic channel for use by other mobile stations in the network. However, MS 102 continues to operate under the assumption that it has an IP address and data-link-layer connection with the network. Furthermore, under normal operation, the network will continue to associate the assigned IP address with MS 102, and PDSN 110 will continue to maintain the first data-link-layer connection with MS 102 by continuing to store connection data pertaining to that connection.

However, at some point after the carrying out of step 202, PDSN 110 inadvertently drops the first data-link-layer connection with MS 102. That is, PDSN 110 deletes the connection data pertaining to that first data-link-layer connection. Note that this deleting process could take the form of actually removing the data, or perhaps just marking that data or connection as inactive. This could occur as a result of a timer value associated with the first data-link-layer connection being incorrectly set to a zero value, or perhaps PDSN 110 could receive a message or command to terminate the connection, where that message or command was sent to PDSN 110 in error. Other possibilities exist as well.

In any event, at step 204, one or more wireless-network entities detect an error condition, which involves detecting that PDSN 110 is incorrectly no longer storing the connection data pertaining to the first data-link-layer connection. As one possibility, some entity connected to PDN 118, such as CN 126, may send packet data to the IP address that had earlier been assigned to MS 102. Using a Mobile-IP scenario as an example (in which case that IP address would be the home address of MS 102), this packet data would be routed to HA 132. HA 132 could then determine that MS 102 is currently using PDSN 110 as its foreign agent, and forward the packet data to PDSN 110. At that point, PDSN 110 may detect that it has received the packet data addressed to MS 102, and further determine that it does not currently have an active data-link-layer connection with MS 102.

As another possibility, detecting the error condition in step 204 could involve detecting that the mobile station is currently registered to receive packet data. As explained above, upon gaining packet-data connectivity (including the establishment of the first data-link-layer connection with PDSN 110), MS 102 may register for VoIP service with a push-to-talk server such as PTTS 124. In some embodiments, SA 128 may handle the registration functions for one or more network elements such as PTTS 124. This registration process may thereafter make MS 102 appear able to place and receive PTT calls, which are a type of VoIP calls.

Further to this example, a network entity such as DCPCS 122 could, from time to time, query PTTS 124 to obtain a list of mobile stations that are registered with PTTS 124 (or SA 128) for PTT service. DCPCS 122 could then determine whether, for each of those registered mobile stations, an active data-link-layer connection is being maintained for the mobile station by a network entity such as PDSN 110. Thus, the detection of the error condition in step 204 could involve DCPCS 122 determining that MS 102 is registered for PTT service with PTTS 124 but that the network is not maintaining a data-link-layer connection with MS 102.

At step 206, responsive to detecting the error condition in step 204, one or more network entities cooperate to establish a second data-link-layer connection between PDSN 110 and MS 102. Like the first data-link-layer connection, the second data-link-layer connection could also be a PPP connection. With respect to the manner in which the second data-link-layer connection is established, that process may be substantially similar to the process by which the first data-link-layer connection between PDSN 110 and MS 102 was established, with the qualifier that, because the error condition was detected on the network side, the initiation of the establishment of the second data-link-layer connection will come from the network side. This is in contrast to the conventional sequence for establishment of a data-link-layer connection between a mobile station and a wireless-network entity such as a PDSN, which is typically initiated by the mobile station, which is seeking to engage in packet-data communication.

Thus, to initiate the establishing of the second data-link-layer connection, a message may be transmitted from the wireless network to MS 102. This message could be transmitted to MS 102 over a paging channel, a traffic channel, and/or any other type of channel. This message could itself be a packet-data-origination message, similar in form to a packet-data-origination message that a mobile station would typically send to the wireless network. That is, the message sent to the mobile station could be the first message in a sequence of messages that makes up a negotiation of the second data-link-layer connection. As another possibility, the message could simply inform the mobile station that the first data-link-layer connection has been inadvertently dropped on the network side, and instruct the mobile station to then initiate establishment of a new data-link-layer connection in the manner that the mobile station normally does.

In either of these two cases, the message could include one or more proposed parameters for the new data-link-layer connection. Upon receiving the message, MS 102 may transmit one or more reply messages to the wireless network. These reply messages may acknowledge receipt of the message, accept one or more of the proposed parameters, and/or propose alternative parameters for the data-link-layer connection. These parameters could include those specified in section 6 of RFC 1661, pertaining to the Link Control Protocol (LCP) aspects of PPP. Furthermore, the ensuing establishment of the data-link-layer connection could involve a link establishment phase as described in RFC 1661, section 3.4, as well as perhaps an authentication phase, as described in section 3.5 of the same document.

As a few examples of options for the form the message could take, it could be a Short Message Service (SMS) message (perhaps sent by SMSC 130) or an Internet Over the Air (IOTA) message. As such, on the way to MS 102, the message may traverse a communication path that includes, as examples, a computer (such as CN 126), a server, a gateway, PDSN 110, DCPCS 122, SMSC 130, MSC 108, BSC 106, and/or BTS 104. One exemplary call path for the message could be: PDSN 110→SMSC 130→MSC 108→BSC 106→BTS 104→MS 102.

Different messaging protocols may be used along different legs of this call path. That is, any of these entities could receive the message, repackage the message according to another messaging protocol, and then send the message along the path. For example, the messaging between PDSN 110 and SMSC 130 could be Short Message Peer to Peer (SMPP) messaging. The messaging between SMSC 130 and MSC 108 could be ANSI-41 Short Message Delivery Point to Point (SMDPP) messaging. And the messaging from MSC 108 downstream to MS 102 could comply with the known industry standard IS-637.

One scenario in which exemplary embodiments may be employed involves an entity such as CN 126 transmitting packet data addressed to MS 102. As stated above as an example, CN 126 could be a second mobile station, and could be attached to PDN 118 through a combination of another BTS, another BSC, and another PDSN. Upon sending the packet data addressed to MS 102, CN 126—or perhaps another entity, such as a proxy, on the communication path between CN 126 and MS 102—may keep track of a timeout period, waiting for confirmation of delivery of the packet data to MS 102. In situations where the data-link-layer connection with MS 102 has been dropped by PDSN 110, this timeout period may expire.

In response to the expiration of the timeout period, the entity keeping track of the timeout period may send the above-described message to MS 102. So, for example, CN 126 could be a second mobile station that sends a Session Initiation Protocol (SIP) INVITE to MS 102. Upon expiration of the timeout period related to waiting for a response to that INVITE, CN 126 may send an SMS message to the Mobile Identification Number (MIN) of MS 102. This message may then be delivered to MS 102 by operation of, among other network entities, SMSC 130, causing MS 102 to establish a new data-link-layer connection with PDSN 110, to enable the packet data to be delivered to MS 102.

In another scenario, an entity such as CN 126 may send packet data addressed to MS 102, and then that sending entity—or perhaps some other entity on the communication path between the sending entity and MS 102—may receive an error message indicating that no data-link-layer connection is currently being maintained between the wireless network and MS 102. In response to receiving this error message, the entity that receives the error message may transmit the above-described message to MS 102 to cause MS 102 to establish a new data-link-layer connection with PDSN 110. This error message could be sent by PDSN 110, HA 132, or any other suitable network entity.

In this error-message scenario, the error message could indicate to the entity that receives the error message that it should send an alert message to a server such as DCPCS 122, which could then handle delivering the above-described message to MS 102 to cause MS 102 to establish the second data-link-layer connection. The entity that sends this alert message to DCPCS 122 could be provisioned with an IP address of DCPCS 122 to use in just such an occurrence. In other embodiments, the error message could indicate the IP address of DCPCS 122, or perhaps a server name that could be resolved by Domain Name Service (DNS) lookup. And many other possibilities exist as well.

Once the second data-link-layer connection has been established between PDSN 110 and MS 102, any packet data that had previously been addressed and sent but not delivered to MS 102 could then be delivered to MS 102 over a communication path that includes the second data-link-layer connection. This delivery of the packet data via the second data-link-layer connection could be as a result of a retransmission of the data by the sending entity or by some other entity on the communication path between the sending entity and MS 102. Some examples could include HA 132 or PDSN 110. Furthermore, some protocol schemes such as TCP/IP and SIP over User Datagram Protocol (UDP) may have retry schemes that will succeed in delivering the packet data after the second data-link-layer connection has been established.

b. A Second Exemplary Method

Figure 3:
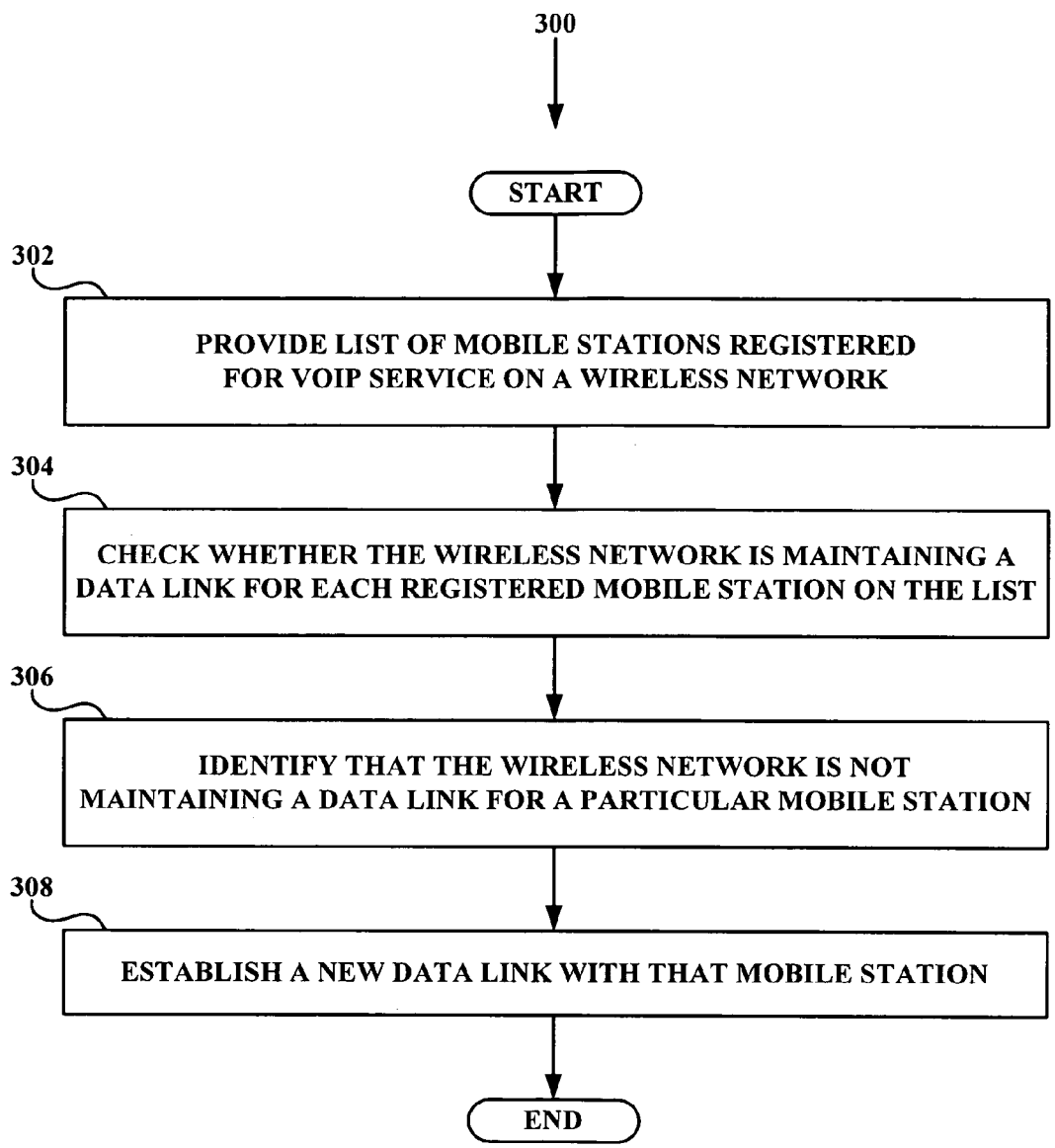
FIG. 3 is a flowchart of an exemplary embodiment, in the form of a method carried out along the communication system of FIG. 1.

FIG. 3 is a flowchart of an exemplary embodiment, in the form of a method carried out along the communication system of FIG. 1. As shown in FIG. 3, the method 300 begins at step 302, when a list of mobile stations that are registered to participate in VoIP sessions on a wireless network is provided. For example, this list may take the form of a mobile-station registry maintained by PTTS 124, perhaps with the help of SA 128. In this example, the VoIP sessions are push-to-talk (PTT) sessions. PITS 124 may receive registration requests from mobile stations. Upon approving those requests, PITS 124 may add the mobile stations to the list of registered mobile stations and then transmit replies to the mobile stations, indicating successful registration. PITS 124 may thereafter facilitate the establishment and conducting of PTT sessions between mobile stations, as is known in the art.

At step 304, a network entity such as DCPCS 122 may check whether the wireless network is maintaining a respective data-link-layer connection with each of the registered mobile stations on the list of registered mobile stations that is being maintained by PTTS 124. For example, DCPCS 122 may query PTTS 124 to obtain the list of registered mobile stations, and then engage in messaging, perhaps with HA 132, to determine which PDSN is supposed to be maintaining a data-link-layer connection for each respective registered mobile station on the list. DCPCS 122 may then engage in messaging with the identified PDSN (which in the case of MS 102 is PDSN 110) to confirm that such a data-link-layer connection is in fact being maintained.

At step 306, DCPCS 122 identifies that the wireless network—specifically PDSN 110 in this example—is not maintaining a data-link-layer connection for MS 102. At step 308, perhaps in cooperation with other network entities, DCPCS 122 responsively establishes a new data-link-layer connection between PDSN 110 and MS 102. Note that establishing the new data-link-layer connection with MS 102 may involve transmitting a message to MS 102 as described above.

Responsive to identifying that the wireless network is not maintaining a data-link-layer connection for MS 102, but before the new data-link-layer connection between PDSN 110 and MS 102 has been established, DCPCS 122 may send a message to PTTS 124 to cause PTTS 124 to set a flag associated with MS 102 to a particular value that indicates that MS 102 currently does not have a data-link-layer connection being maintained for it on the network side. Once the new data-link-layer connection with MS 102 has been established, DCPCS 122 may send a message to PTTS 124 to cause PTTS 124 to clear the flag associated with MS 102.

If PTTS 124 happens to receive an invite message from a mobile station (perhaps CN 126) requesting initiation of a VoIP (PTT) session with MS 102 while the flag associated with MS 102 is set to the particular value, PTTS 124 may determine that the flag is in fact set to that particular value, and responsively transmit an error message to CN 126. This error message may indicate that no data-link-layer connection is currently being maintained between the wireless network and MS 102. CN 126 may thus be notified more quickly than it would by virtue of waiting for either a locally or remotely tracked timeout period to expire, or for the invite message to make its way to PDSN 110 prior to the lack of data-link-layer connection being detected.

4. Conclusion

Various exemplary embodiments have been described above. Those skilled in the art will understand, however, that changes and modifications may be made to those examples without departing from the scope of the claims.

What is claimed is:

1. A method comprising:
    establishing a first data-link-layer connection between (i) a wireless-network entity in a wireless network and (ii) a mobile station, wherein the wireless-network entity responsively stores connection data pertaining to the first data-link-layer connection;
    detecting an error condition, wherein detecting the error condition comprises detecting that the wireless-network entity is incorrectly no longer storing the connection data pertaining to the first data-link-layer connection; and
    responsive to detecting the error condition, establishing a second data-link-layer connection between the wireless-network entity and the mobile station.

2. The method of claim 1, wherein the first and second data-link-layer connections are point-to-point protocol (PPP) connections.

3. The method of claim 1, wherein the first wireless-network entity is a packet data serving node (PDSN).

4. The method of claim 1, wherein detecting the error condition further comprises detecting the receipt of packet data addressed to the mobile station.

5. The method of claim 4, further comprising:
    assigning an Internet Protocol (IP) address to the mobile station, wherein the packet data is addressed to the assigned IP address.

6. The method of claim 4, further comprising:
    after establishing the second data-link-layer connection, transmitting the packet data to the mobile station via the second data-link-layer connection.

7. The method of claim 1, wherein detecting the error condition further comprises detecting that the mobile station is currently registered to receive packet data.

8. The method of claim 7, wherein detecting that the mobile station is currently registered to receive packet data comprises detecting that the mobile station is currently registered to participate in Voice over Internet Protocol (VoIP) sessions.

9. The method of claim 1, wherein establishing the second data-link-layer connection comprises transmitting a message to the mobile station.

10. The method of claim 9, wherein transmitting the message to the mobile station comprises transmitting the message to the mobile station over at least one of a paging channel and a traffic channel.

11. The method of claim 9, wherein the message is of a message type selected from the group consisting of a packet-data-origination message, a Short Message Service (SMS) message, an Internet Over the Air (IOTA) message, and a message requesting that the mobile station initiate establishment of the second data-link-layer connection.

12. The method of claim 9, wherein the message comprises at least one proposed parameter for the second data-link-layer connection, the method further comprising:
the mobile station receiving the message; and
responsive to receiving the message, the mobile station transmitting a reply message comprising at least one of an acknowledgement of the message, acceptance of at least one proposed parameter for the second data-link-layer connection, and at least one proposed alternative parameter for the second data-link-layer connection.

13. The method of claim 9, wherein transmitting the message to the mobile station comprises transmitting the message over a communication path that comprises at least one of a computer, a server, a gateway, a packet data serving node (PDSN), a data call processing control server (DCPCS), a Short Message Service Center (SMSC), a mobile switching center (MSC), a base station controller (BSC), a base transceiver station (BTS), and a second mobile station.

14. The method of claim 9, further comprising:
transmitting packet data addressed to the mobile station,
wherein transmitting the message to the mobile station comprises transmitting the message to the mobile station in response to an expiration of a timeout period, wherein the timeout period relates to confirmation of delivery of the packet data to the mobile station.

15. The method of claim 9, further comprising:
transmitting packet data addressed to the mobile station; and
receiving an error message indicating that no data-link-layer connection is currently being maintained between the wireless network and the mobile station,
wherein transmitting the message to the mobile station comprises transmitting the message to the mobile station in response to receiving the error message.

16. A method comprising:
providing a list of mobile stations that are registered to participate in Voice over Internet Protocol (VoIP) sessions on a wireless network;
checking whether the wireless network is maintaining a respective data-link-layer connection with each of the registered mobile stations on the list; and
identifying that the wireless network is not maintaining a data-link-layer connection for a given registered mobile station, and responsively (a) establishing a new data-link-layer connection with the given registered mobile station and (b) setting a flag associated with the given registered mobile station to a first value, the method further comprising:
receiving an invite message from a second mobile station, wherein the invite message requests initiation of a VoIP session with the given registered mobile station; and
determining that the flag associated with the given registered mobile station is set to the first value, and responsively transmitting an error message to the second mobile station, wherein the error message indicates that no data-link-layer connection is currently being maintained between the wireless network and the given registered mobile station.

17. The method of claim 16, further comprising:
responsive to establishing the new data-link-layer connection with the given registered mobile station, clearing the flag associated with the given registered mobile station.

18. The method of claim 16, wherein establishing the new data-link-layer connection with the given registered mobile station comprises transmitting a message to the given registered mobile station.

* * * * *